United States Patent [19]

Ellersick

[11] Patent Number: 5,010,293
[45] Date of Patent: Apr. 23, 1991

[54] INRUSH CURRENT LIMITING CIRCUIT

[75] Inventor: William F. Ellersick, Redwood City, Calif.

[73] Assignee: Raynet Corporation, Menlo Park, Calif.

[21] Appl. No.: 439,596

[22] Filed: Nov. 20, 1989

[51] Int. Cl.$^5$ ............................................. G05F 1/573
[52] U.S. Cl. .................................... 323/278; 323/908; 361/58; 361/101; 361/111
[58] Field of Search ................... 363/50; 323/277, 278, 323/908; 361/56, 57, 58, 90, 91, 100, 101, 111

[56] References Cited

U.S. PATENT DOCUMENTS

| | | | |
|---|---|---|---|
| 3,407,339 | 10/1968 | Booher . | |
| 3,935,511 | 1/1976 | Boulanger | 317/20 |
| 3,996,509 | 12/1976 | Kichak | 321/13 |
| 4,020,395 | 4/1977 | Erickson et al. | 361/59 |
| 4,174,535 | 11/1979 | Mueller et al. | 323/277 |
| 4,396,882 | 8/1983 | Kellenbenz | 323/908 |
| 4,494,064 | 1/1985 | Harkness | 323/277 |
| 4,513,341 | 4/1985 | Kollanyi | 361/58 |
| 4,531,083 | 7/1985 | Hoffman | 323/278 |
| 4,589,049 | 5/1986 | Krumrein | 361/56 |
| 4,750,078 | 6/1988 | Ganger et al. | 361/56 |
| 4,809,122 | 2/1989 | Fitzner | 323/278 |

Primary Examiner—Peter S. Wong
Attorney, Agent, or Firm—Dennis E. Kovach; David B. Harrison

[57] ABSTRACT

An inrush current limiting circuit in accordance with the principles of the present invention limits initial current flow to a highly initially reactive power load. The current limiting circuit comprises a plug in connection to a power source and two conductor paths leading from the plug in connection. A power FET has a source element to drain element path in series with one of the conductor paths and has a gate connection. A bipolar transistor is connected to shunt the gate element of the power FET to the potential at its source element when the bipolar transistor is conducting, thereby to limit the current passing through the power FET. A sense resistor is in series with one of the conductor paths for controlling a base element of the bipolar transistor to cause it to conduct when current through the sense resistor exceeds a predetermined amount. The bias resistor is connected to the gate element of the power FET normally to bias it into full conduction between the source and drain elements when the bipolar transistor is not conducting.

13 Claims, 2 Drawing Sheets

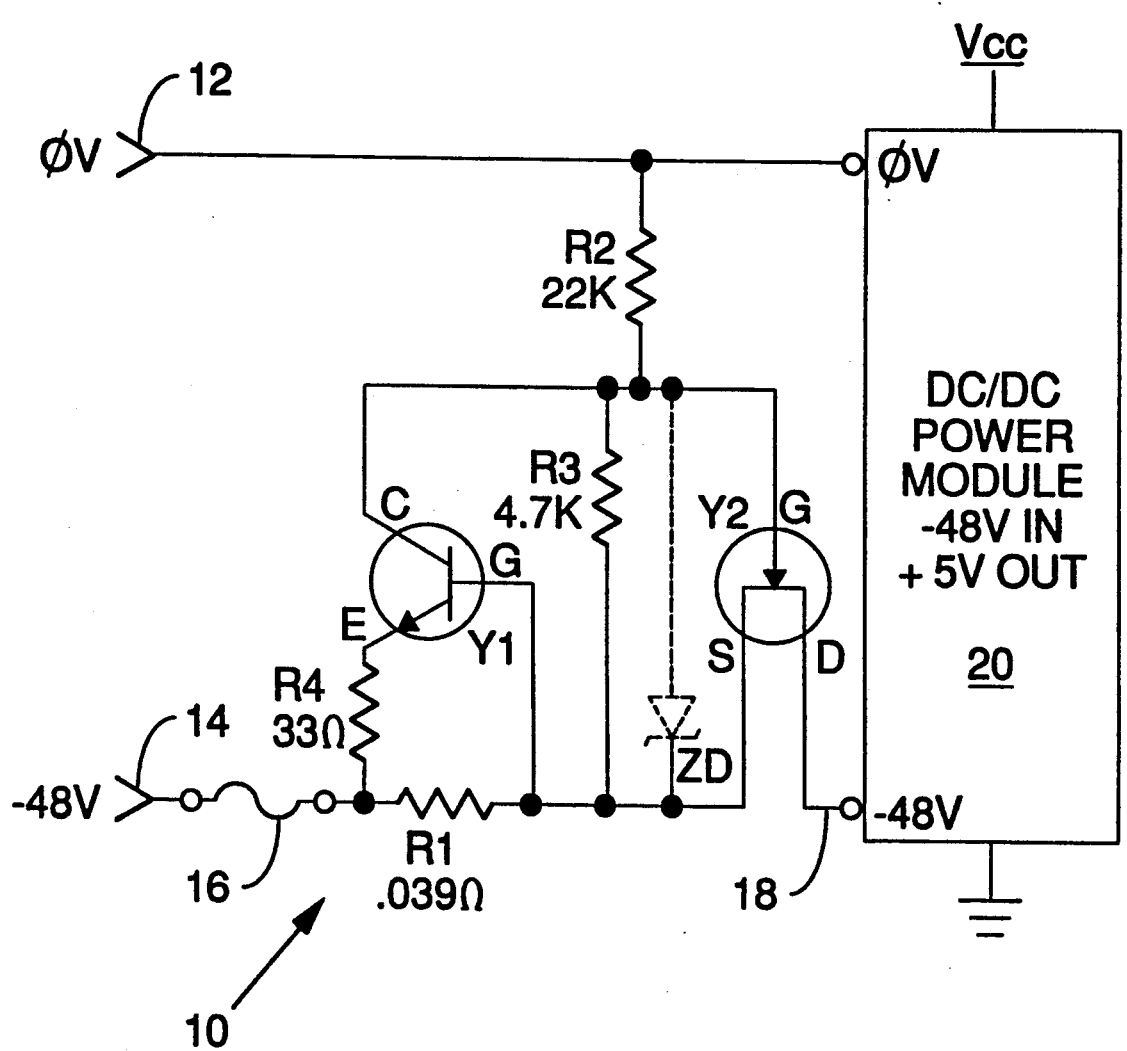
FIG_1

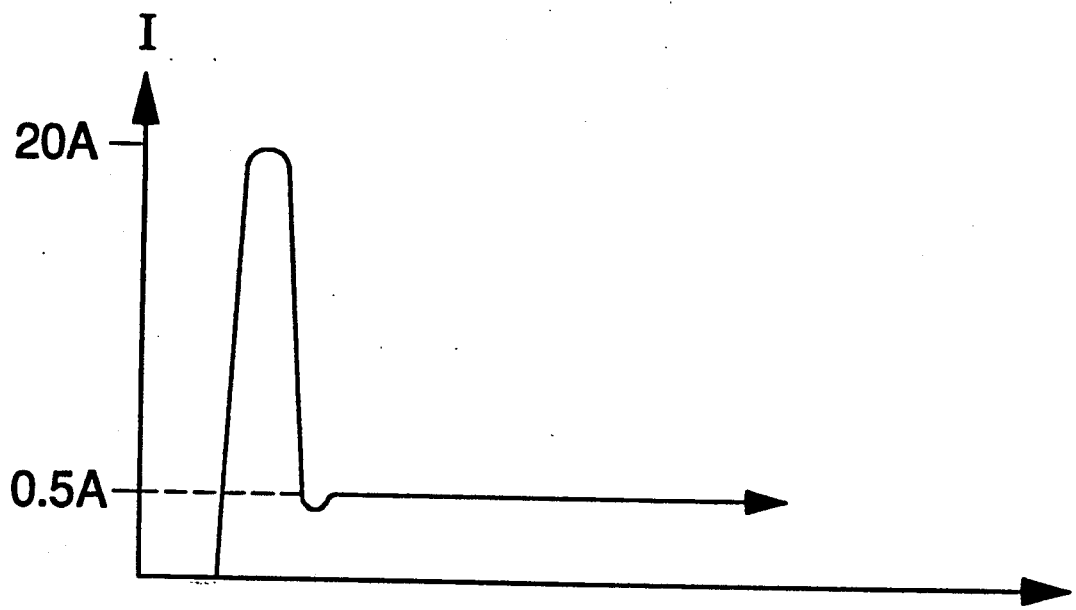
FIG_2a
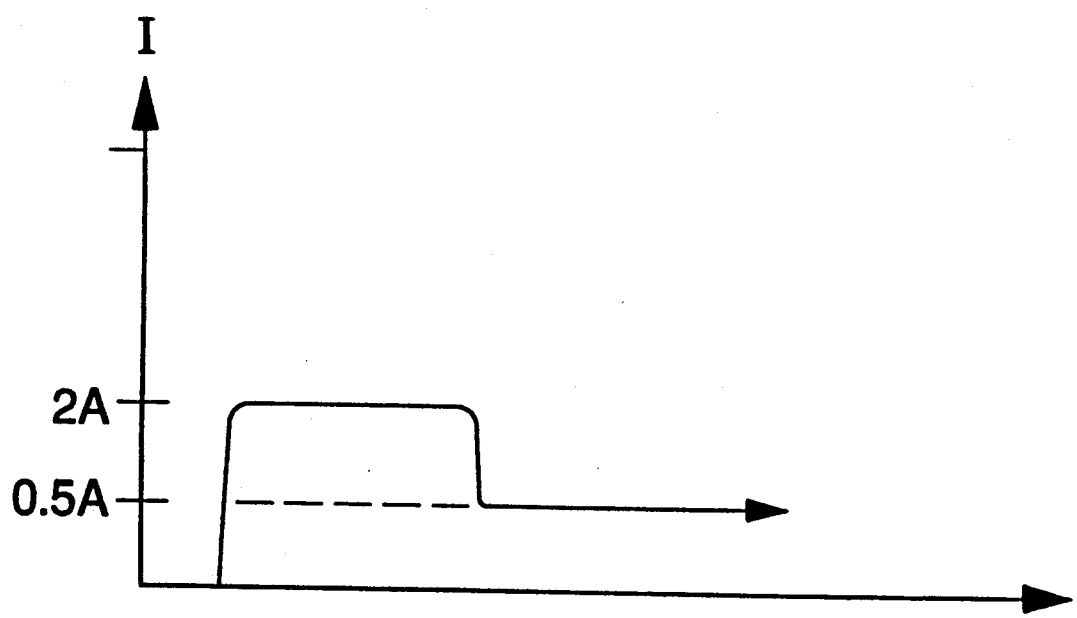
FIG_2b

INRUSH CURRENT LIMITING CIRCUIT

FIELD OF THE INVENTION

The present invention relates to current overload protection circuits. More particularly, the present invention relates to an inrush current limiting circuit for limiting current otherwise flowing into highly capacitive power loads when connected to a high current capacity DC distribution bus.

BACKGROUND OF THE INVENTION

Many circuits and systems include the need for protection against inrush current. By "inrush current" is meant an initial high current flow, usually a short duration surge, which is usually attributable to a highly reactive initial power load. Inrush current is particularly a problem within telecommunications systems which typically provide distributed 48 volt battery to all of the circuits throughout the network.

Telecommunications circuits are usually formed as small plug-in circuit boards carrying and interconnecting solid state and passive circuit elements. Such circuit elements typically require voltages lower than the nominal 48 volt common battery, and so DC to DC power conversion modules are typically included on each such plug-in board to provide suitable lower operating DC voltages, such as 5 volts and 12 volts. One characteristic of the ubiquitous DC to DC power conversion module is that it presents a highly capacitive initial power load to the supply bus, with resultant enormous instantaneous current flow when power is first applied.

When the module is plugged into a backplane supplying the 48 volt common battery, unless limited, the inrush current has been measured at over 40 Amperes (100 microsecond duration) with a 48 volt, 15 watt DC to DC conversion supply. This inrush current is well over the rating of typical connector pins which are usually rated at about one to two Amperes maximum. The inrush current also may cause sparking with resultant corrosion of the connector pins and sockets and other exposed elements, due to the ozone thus created. Input voltage regulation to other on-line circuit boards within the system may be adversely affected during the interval of a high inrush current surge.

Particularly within telecommunications systems, where the availability of continuous service for the service subscriber is mandatory, modules are plugged into and out of the system without shutting down the 48 volt common battery. Intermittant contact of power pins on insertion and removal of circuit boards requires that any inrush current limiting circuit respond very quickly. It is virtually impossible to insert or remove a circuit board with a 96 pin DIN connector, for example, without some intermittant contact of pins carrying the 48 volt common battery primary power supply.

One prior approach to inrush current limiting is a simple series resistor. Such a resistor must be about 10 Ohms to limit inrush current to 5 Amperes with a 48 volt common battery supply. With a nominal steady state input current of 0.65 Amperes, use of a 10 Ohm limiting resistor results in a series voltage drop of 6.5 volts, which will reduce the input voltage range of the circuit board and which will result in over four watts heat dissipation at the limiting resistor.

A relay may be used to short out a series limiting resistor after the inrush current surge has passed. This approach effectively reduces the series voltage drop during normal operation of the circuit board elements. However, the slow mechanical time constant of electromechanical relays allows high currents to flow while the relay contacts remain closed when contact to the power pins is intermittant on insertion or removal, which is almost unavoidable.

An active circuit, in lieu of an electromechanical relay, to short out a series resistor is another approach that may be followed. However, unlike the circuit of the present invention, such approach still requires a series current limiting resistor which adds to the cost of the protection circuit and which creates a time constant. A circuit having a time constant characteristic will cause problems under intermittant contact conditions.

Negative temperature coefficient (NTC) resistors may be used to limit inrush current. At room temperature, these NTC resistors may have resistances of up to 100 Ohms, which reduce to a few ohms at high temperature. Upon insertion of the circuit board, inrush current is reduced. As current continues to be drawn through the NTC resistor, it warms by as much as 20 to 30 degrees Centigrade, resulting in lower resistance and voltage drop. The thermal time constant in NTC resistors allows high inrush currents to flow on intermittant contact on circuit board removal, or on a reinsertion thereof just after removal. In addition, NTC resistors are not a good solution for a system that must operate over a temperature range wider than 20 degrees Centigrade, as the resistance thereof may drop at high temperature, allowing high inrush current to flow. The resistance of NTC resistors (and series voltage drop) may also be too high when the ambient temperature is very low after warmup.

Another approach, quite similar to the present invention, is acknowledged in the prior art. For example, U.S. Pat. No. 4,494,064 (column 1 line 66 through column 2, line 8) characterizes another prior art approach as employing a series connected linear limiter circuit utilizing junction transistors or field effect transistors for protection against inrush current. According to that disclosure, use of active devices in series for control of inrush current surges from a DC bus is fast and simple, but active devices exhibit excessive power dissipation during current limiting and are said to be suitable only for low current applications. While that disclosure recognizes a possible solution to the problem, no circuit details or design considerations are provided, and the worker in the art is left to his skill and speculation.

Thus, a hitherto unsolved need has remained for an effective inrush current limiting circuit which overcomes the limitations and drawbacks of the prior approaches.

SUMMARY OF THE INVENTION WITH OBJECTS

A general object of the present invention is to provide an inrush current limiting circuit which overcomes the limitations and drawbacks of the prior art.

More specific objects of the present invention are to provide an effective inrush current limiting circuit which presents a very low series voltage drop in normal operation in order to maximize input voltage range; which includes a few readily available circuit elements arranged in a manner; which minimizes circuit complexity and costs; and, which works effectively and reliably over the useful life of the protected circuit without requiring any special thermal heat dissipation considerations.

An inrush current limiting circuit in accordance with the principles of the present invention limits initial current flow to a highly initially reactive power load. The current limiting circuit comprises a plug in connection to a power source and two conductor paths leading from the plug in connection. A power FET has a source element to drain element path in series with one of the conductor paths and has a gate connection. A bipolar transistor is connected to shunt the gate element of the power FET to the potential at its source element when the bipolar transistor is conducting, thereby to limit the current passing through the power FET. A sense resistor is in series with one of the conductor paths for controlling a base element of the bipolar transistor to cause it to conduct when current through the sense resistor exceeds a predetermined amount. A bias resistor is connected to the gate element of the power FET normally to bias it into full conduction between the source and drain elements when the bipolar transistor is not conducting.

In one aspect of the present invention the power source comprises a common battery supply within a telecommunications system, such as minus 48 volts.

In another aspect of the present invention, the highly initially reactive power load comprises a DC to DC converter module for converting the power source potential to a lower voltage.

In a further aspect of the present invention a resistor is in series with the bias resistor, thereby forming a series voltage divider network across the power source and downstream of the sense resistor in order to prevent the full input voltage level from appearing across the gate to source path of the power FET and damaging it.

In one more aspect of the present invention a zener diode may be used to regulate voltage drop across the gate to source path of the power FET.

In one further aspect of the present invention, a negative feedback resistor is provided in series with an emitter element of the bipolar transistor, thereby to stabilize the circuit and prevent the power FET from oscillating.

In yet another aspect of the present invention, a fuse having a slow thermal time constant is included in series with the power input to the circuit.

In a specific implementation of the present invention, an inrush current limiting circuit is provided for limiting inrush current from a minus 48 volt common battery power supply within a telecommunications system to a DC to DC power converter module of a plug-in circuit board having plug-in connection pins for making electrical contact at a backplane with the common battery supply voltage. In this implementation the circuit includes a common path between the common node of the power supply and the common node of the DC to DC power converter module; a supply path between the minus 48 volt supply side of the power supply and the supply voltage node of the DC to DC power converter module; an enhancement mode power FET having a source to drain resistance path in series with the supply path, and having a gate connected through a bias resistor to the common path, thereby normally to be in a conducting state and to manifest very low resistance across the source to drain resistance path. A current sense resistor is in series with the supply path upstream of the enhancement mode power FET, and an NPN bipolar transistor has an emitter element connected to the supply path through a negative feedback series resistor upstream of the current sense resistor. The bipolar transistor has a base element connected to the supply path between the current sense resistor and the source to drain resistance path of the power FET. A collector element of the bipolar transistor is connected to the gate element of the power FET, so that as the bipolar transistor begins to conduct it causes the power FET to begin to cease conduction. Thus, as current passing through the sense resistor becomes excessive, the power FET is thereupon caused to reduce conduction by increased resistance across the source to drain path thereof.

One aspect of this implementation of the present invention is a voltage level protection resistor connected between the gate element of the power FET and the base element of the bipolar transistor.

Another implementation of this aspect of the present invention is a zener diode connected between the gate element of the power FET and the base element of the bipolar transistor in order to protect the power FET from damage from excess voltage drop across the gate to source path.

Yet another aspect of this implementation of the present invention is that inrush current is limited to be not greater than approximately two Amperes.

A still further aspect of this implementation is that voltage drop in normal operation of the inrush current limiting circuit at 0.5 Amperes is approximately 0.2 volts, resulting in a circuit power consumption of only 0.1 watts.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is a schematic circuit diagram of an inrush current limiting circuit in accordance with the principles of the present invention.

FIGS. 2A and 2B are two graphs illustrating inrush current surges without and with the inrush current limiting circuit depicted in FIG. 1.

DETAILED DESCRIPTION OF A PREFERRED EMBODIMENT

With reference to FIG. 1, an inrush current limiting circuit 10 includes input connector pins 12 and 14 connectable respectively to common and −48 volt nodes of a backplane by plug in connection of a circuit board carrying the circuit 10, and a DC to DC converter module 20, for example. While two pins 12 and 14 appear in FIG. 1, in practice e.g. three separate connector pins may implement the pin 12, and three connector pins may implement the pin 14, in order to handle the current required by the circuit elements of the circuit board.

A series fuse 16 in the line leading from the −48 volt pin 14 limits current to a maximum value, such as 0.750 Amperes. The fuse 16 has a sufficiently slow thermal time constant in order to handle momentary inrush surges without opening. A low Ohmic value resistor R1 is in series with the minus 48 volt line, as is also the source and drain of a power FET Y2, such as a type IRF540, made by Motorola, or equivalent. The FET Y2 is an enhancement mode, silicon gate TMOS device, and has a very low on-resistance characteristic.

The drain line of the Y2 FET leads directly to a minus 48 volt input 18 of the DC to DC converter module 20, whereas the 0 volt input of the module 20 is connected directly to the common voltage pin 12.

An NPN transistor Y1, such as type 2N3904 available from a variety of suppliers, has an emitter connected through a resistor R4 to the −48 volt line upstream of the R1 series resistor. The base of the transistor Y1 is connected immediately downstream of the R1 series resistor. A series resistance voltage divider network of resistors R2 and R3 connect across the 0 volt and −48 volt lines downstream of the sense resistor R1 and before the FET Y2.

The inrush current limiting circuit 10 actively limits inrush current surges by turning off the Y2 power FET when input current exceeds a predetermined threshold value. Inrush current may thereby be limited to less than 2.0 Amperes, with minimal series voltage drop in normal operation. Input current is sensed across R1. As input current rises, the emitter to base voltage at the transistor Y1 increases. When and if the voltage between the base and emitter of transistor Y1 exceeds 0.7 volts, the transistor Y1 begins to conduct. [With R1=0.39 Ohms, Y1 begins to conduct at −1.8 Amperes].

When the transistor Y1 conducts, the gate to source voltage at the FET Y2 goes down, thereby increasing the drain to source resistance of the FET Y2. As the drain to source resistance of the series-connected FET Y2 increases, input current being drawn by the highly capacitive initial power load of the module 20 is correspondingly decreased. This decrease in inrush current continues until the transistor Y1 ceases to conduct.

The emitter resistor R4 reduces the gain of the circuit 10 and prevents the FET Y2 from oscillating between fully on and fully off. Instead, an equilibrium is reached where the transistor Y1 is partially on, controlling the drain to source resistance of the FET Y2 in order to regulate the current during inrush current surges. [With R1=0.39 Ohms, inrush current is held by the circuit 10 to approximately 1.8 Amperes].

After the inrush current surge has passed, input current drops and the transistor Y1 ceases to conduct. Then, the gate to source voltage at the FET Y2 is determined by the voltage divider formed by the series resistors R2 and R3, which turn the FET Y2 fully on. Series voltage drop on the input to the power converter module 20 during quiescent operation is due to the drop across the sense resistor R1 and the saturated drain to source resistance of the FET Y2. [In the case of an IRF540 FET, this resistance is less than 0.08 Ohms].

For a 25 watt, 80% efficiency DC to DC power converter module, such as the module 20, nominal quiescent input current with a 48 volt supply is 0.65 Amperes. [With R1 =0.39 Ohms, series voltage drop at 0.65 Amperes is about 0.3 volts]. Even lower series voltage drops may be achieved by reducing the value of the sense resistor R1, providing higher inrush currents are acceptable.

The resistor R3 is provided only to prevent excessive gate to source voltage, and may be replaced by a zener diode ZD, graphed in broken line phantom in FIG. 1, should more precise regulation be desired. The resistor R3 may be eliminated if the power FET Y2 is capable of taking the full input voltage drop across its gate without breakdown.

While the FET Y2 does dissipate substantial instantaneous power during inrush current surge and limiting, and should therefore have a large junction area, since the inrush current surge lasts only for a few milliseconds, the FET Y2 has no need for heat sinking to the external ambient. All other components of the circuit 10 dissipate less than about ¼ watt.

Resistor values shown in FIG. 1 are typical for a 48 volt, 5-25 watt DC to DC power module, such as a type PKC4111 module made by RIFA AB, Power Products, S-163 Stockholm, Sweden, or equivalent. Different values may be used to optimize the circuit 10 for different nominal currents, input voltages and transistor characteristics. The fuse 16 and the power converter module 20 are not part of the inrush current limiting circuit 10 and are included to illustrate a typical configuration.

With reference to FIG. 2A, inrush current without the circuit 10 is shown as a 20 Ampere spike of relatively short duration. When the circuit 10 is in place, inrush current is limited to e.g. 2 Amperes, and the current limitation occurs over a somewhat longer interval, as graphed in FIG. 2B.

The advantages of the inrush current limiting circuit 10 shown in FIG. 1 include very effective inrush current limiting, low series voltage drop and low power dissipation. Inrush current is limited effectively even during intermittant power supply connections incident to plug-in and out (installation and removal) of a circuit board carrying the circuit 10 and the module 20. Only two solid state devices are used, enhancing reliability. The circuit 10 will work over wide temperature, input current, and voltage ranges. The bipolar transistor Y1 provides accurate current regulation due to its non-linear base to emitter voltage response. The combination of the bipolar transistor Y1 with the FET Y2 allows the accurate regulation at a low series voltage drop. Thus, the circuit 10 achieves an effective solution to the problem of limiting inrush current and may be implemented with readily available components at low cost. All of the resistors are quarter watt, and the transistors Y1 and Y2 do not need heat sink packages

Having thus described an embodiment of the invention, . it will now be appreciated that the objects of the invention have been fully achieved in realizing an inrush current limiting circuit. Widely differing embodiments and applications of the invention will suggest themselves without departing from the spirit and scope of the invention. The disclosures and the description herein are purely illustrative and are not intended to be in any sense limiting.

I claim:

1. An inrush current limiting circuit for limiting initial current flow to a power load characterized by a high capacitive reactance otherwise causing excessive inrush current, the circuit comprising:

plug in connection means to a power source and two conductor paths leading from the plug in connection means, power FET means having a source element to drain element path in series with one of the conductor paths and having a gate connection, active current sense means for sensing excessive inrush current including bipolar transistor means connected to shunt the gate element of the power FET means to the potential at its source element when the bipolar transistor means is conducting, and sense resistor means in series with one of the conductor paths for controlling a base element of the bipolar transistor means to cause the bipolar transistor means to conduct when current through the sense resistor exceeds a predetermined amount, and, bias resistor means connected to the gate element of the power FET means normally to bias the power FET means into full conduction between the source and drain elements when the bipolar transistor means is not conducting.

2. The inrush current limiting circuit set forth in claim 1 wherein the power source comprises a common battery supply within a telecommunications system.

3. The inrush current limiting circuit set forth in claim 2 wherein the potential of the common battery supply is approximately minus 48 volts.

4. The inrush current limiting circuit set forth in claim 1 wherein the highly initially reactive power load comprises a DC to DC converter module for converting the power source potential to a lower voltage.

5. The inrush current limiting circuit set forth in claim 1 further comprising a resistor means in series with the bias resistor means, thereby forming a series voltage divider network across the power source and downstream of the sense resistor means.

6. The inrush current limiting circuit set forth in claim 1 further comprising zener diode voltage limiting means in series with the bias resistor means, thereby forming a series voltage divider network across the power source and downstream of the sense resistor means.

7. The inrush current limiting circuit set forth in claim 1 further comprising negative feedback resistor means in series with an emitter element of the bipolar transistor means, the negative feedback resistor means for reducing the gain of the active current sense means in order to inhibit the power FET means from oscillating between fully on and fully off incident to at connection of the plug-in connection means to the power source.

8. An inrush current limiting circuit for limiting inrush current from a common battery power supply within a telecommunications system to a DC to DC power converter module of a plug-in circuit board having plug-in connection pins for making electrical contact at a backplane with the common battery supply voltage, the circuit including:

a return path between the common node of the power supply and the common node of the DC to DC power converter module, a supply path between a supply node of the power supply and the supply voltage node of the DC to DC power converter module, an enhancement mode power FET means having a source to drain resistance path in series with the supply path, and having a gate connected through bias resistor means to the common path, thereby normally to be in a conducting state and to manifest very low resistance across the source to drain resistance path, current sense resistor means in series with the supply path upstream of the enhancement mode power FET means, NPN bipolar transistor means having an emitter element connected to the supply path through a negative feedback series resistor means upstream of the current sense resistor means, having a base element connected to the supply path between the current sense resistor means and the source to drain resistance path of the power FET means, and having a collector element connected to the gate element of the FET means, the negative feedback series resistor means for reducing the gain of the inrush current limiting circuit thereby to inhibit the power FET means from oscillating between fully on and fully off.

9. The inrush current limiting circuit set forth in claim 8 wherein the potential of the common battery power supply is approximately minus 48 volts.

10. The inrush current limiting circuit set forth in claim 8 further comprising a resistor means connected between the gate element of the power FET means and the base element of the bipolar transistor means.

11. The inrush current limiting circuit set forth in claim 8 further comprising zener diode means connected between the gate element of the power FET means and the base element of the bipolar transistor means.

12. The inrush current limiting circuit set forth in claim 8 wherein inrush current is limited to be not greater than approximately two Amperes.

13. The inrush current limiting circuit set forth in claim 10 wherein the bias resistor means has a resistance of approximately 22,000 ohms, the current sense resistor means has a resistance of approximately 0.39 ohms, the negative feedback series resistor means has a resistance of approximately 33 ohms, and the resistor means connected between the gate element of the power FET means and the base element of the bipolar transistor means has a resistance of approximately 4,700 ohms; and, wherein the inrush current is limited to be not greater than approximately two amperes.

* * * * *